UNITED STATES PATENT OFFICE.

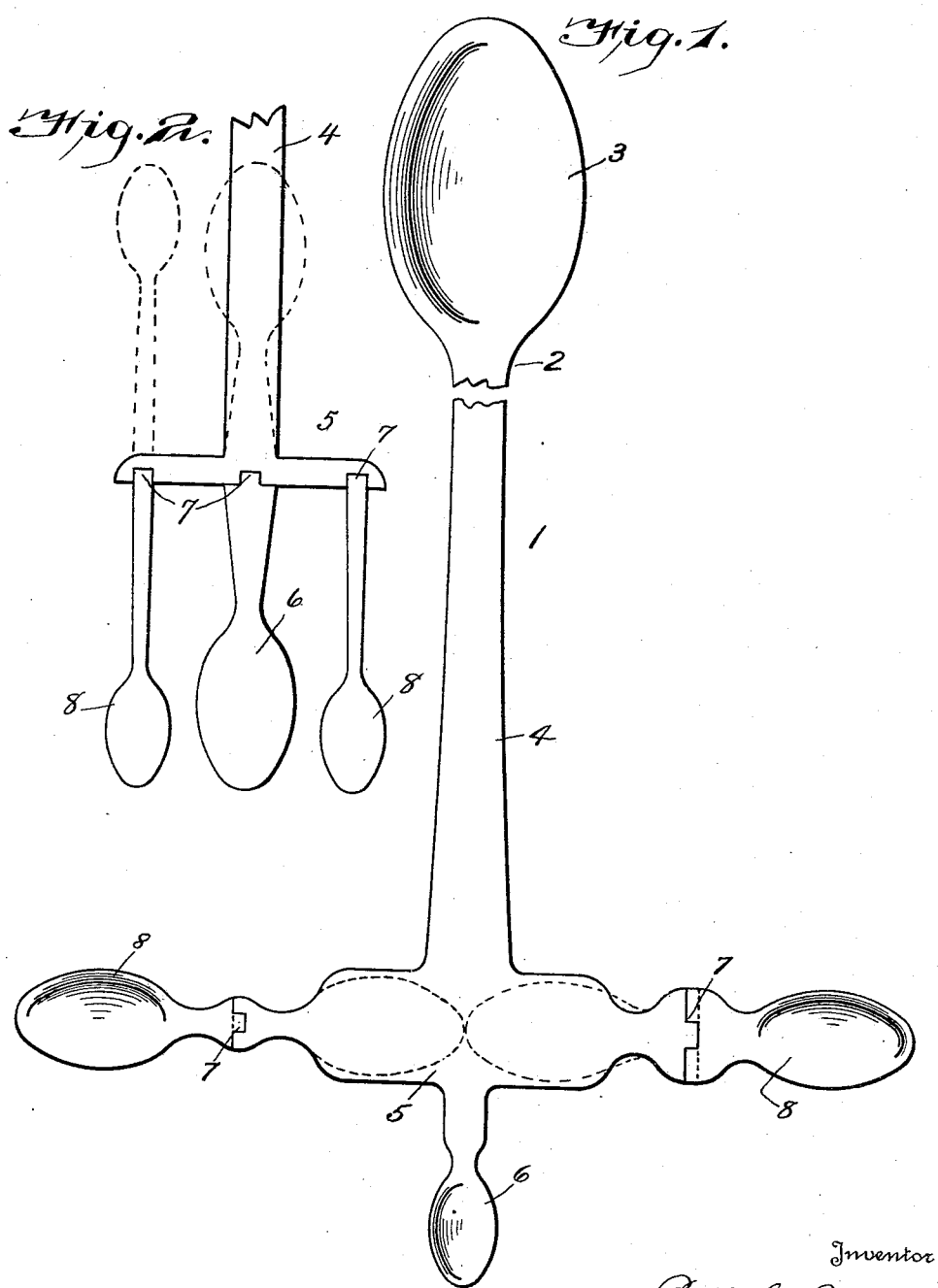
B. C. SABIN.
CULINARY IMPLEMENT.
APPLICATION FILED DEC. 6, 1915.
1,203,414.  Patented Oct. 31, 1916.

BELLE C. SABIN, OF CHICAGO, ILLINOIS.

CULINARY IMPLEMENT.

1,203,414.  Specification of Letters Patent.  Patented Oct. 31, 1916.

Application filed December 6, 1915. Serial No. 65,338.

*To all whom it may concern:*

Be it known that I, BELLE C. SABIN, a citizen of the United States, residing at Chicago, in the county of Cook and State of Illinois, have invented certain new and useful Improvements in Culinary Implements; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to culinary implements, but more particularly to a stirring or mixing spoon to be employed when cooking for the purpose of properly stirring or agitating the contents of a receptacle during the cooking process, or during the mixing process of uncooked batters, salad dressings and the like.

In cooking, it frequently becomes necessary for the cook to taste or sample the contents when adding the final seasonings, particularly when a certain flavor is desired to be obtained, and also under other conditions, and in the mixing of batters, and dressings, particularly for salads where many seasonings are to be added after the body of the dressing has been cooked, as is of course well known to those skilled in the art.

That the tasting and sampling of the contents being cooked and of uncooked food dressings, batters and the like is extremely unsanitary, is a recognized fact, and it is for the purpose of remedying the unsanitary feature attendant upon the tasting as sampling of the aforesaid mixture during the process of cooking and mixing uncooked articles, that I have made this present invention which consists in the novel construction and arrangement of a stirring spoon, so that the spoon proper used for stirring or agitating the contents of a receptacle while cooking is not employed for tasting or sampling the same, but the spoon is so constructed and arranged that a plurality of tasting or sampling spoons or implements are arranged and formed on the handle or the main stirring spoon, which auxiliary spoons or implements are employed for tasting and sampling the contents of a receptacle during the process of cooking.

Referring to the accompanying drawing—Figure 1 is a plan view of a stirring or agitating spoon constructed in accordance with this invention, and Fig. 2 is a fragmentary plan of a modification.

Referring to the figures by reference numerals—1 indicates the device which includes the large stirring or agitating spoon 2 embodying the large spoon bowl 3 and the elongated handle 4, which is provided with a transverse enlargement 5 and which terminates in a relatively small spoon bowl or implement 6.

Hinged to each end of the transverse enlargement 5 as at 7 is an auxiliary spoon bowl 8 which is of such size and dimensions that it is capable of folding back upon the transverse enlargement 5 in the manner as shown in dotted lines in the drawing, so that when not in use the spoons or implements 8 are folded back upon the main stirring spoon to provide a laterally extended handle for the same.

Having thus fully described the invention, its use and operation is obvious, as the auxiliary spoons 6 and 8 are employed for tasting or sampling the contents of a receptacle being cooked without resorting to the main spoon 3, which it has been found provide a prevalent cause of infection of articles during the cooking process. The arrangement is also particularly adapted for measuring seasoning ingredients by use of the auxiliary spoons.

It is apparent that this invention is susceptible to certain changes and alterations in the arrangement and construction of the parts, and I consider myself clearly entitled to all such modifications as fall within the limit and scope of the appended claim.

What I claim as new and desire to secure by Letters Patent of the United States is—

A stirring or agitating spoon for culinary purposes including an elongated handle, a transverse enlargement on said handle, members hinged to each end of said transverse enlargement and foldable back upon the same, the said transverse enlargement and foldable members hinged thereto providing an extended transverse handle for the stirring or agitating spoon, substantially as described.

In testimony whereof, I affix my signature, in presence of two witnesses.

BELLE C. SABIN.

Witnesses:
 EVA L. GRANT,
 JOHN M. SABIN.

Copies of this patent may be obtained for five cents each, by addressing the "Commissioner of Patents, Washington, D. C."